US009986043B2

(12) United States Patent
Baltar et al.

(10) Patent No.: US 9,986,043 B2
(45) Date of Patent: May 29, 2018

(54) TECHNOLOGY FOR SERVICE MANAGEMENT APPLICATIONS AND CLOUD WORKLOAD MIGRATION

(71) Applicant: International Business Machines Corporation, Armonk, NY (US)

(72) Inventors: Alexandre Q. Baltar, São Paulo (BR); Guilherme S. Elias, Sumare (BR); Marcos V. Paraiso, São Paulo (BR); Sergio Varga, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 14/836,607

(22) Filed: Aug. 26, 2015

(65) Prior Publication Data

US 2017/0064009 A1    Mar. 2, 2017

(51) Int. Cl.
*H04L 12/24* (2006.01)
*H04L 29/08* (2006.01)
*H04L 12/26* (2006.01)

(52) U.S. Cl.
CPC .......... *H04L 67/148* (2013.01); *H04L 41/084* (2013.01); *H04L 41/0853* (2013.01); *H04L 41/0896* (2013.01); *H04L 41/0886* (2013.01); *H04L 43/0817* (2013.01)

(58) Field of Classification Search
CPC . H04L 67/148; H04L 41/084; H04L 41/0853; H04L 41/0896; H04L 41/0886; H04L 43/0817
USPC ........................................................ 709/226
See application file for complete search history.

(56) References Cited

U.S. PATENT DOCUMENTS

| 7,886,038 | B2 | 2/2011 | Ferris | |
|---|---|---|---|---|
| 8,566,838 | B2 | 10/2013 | Sabin | |
| 8,631,099 | B2 | 1/2014 | Morgan | |
| 8,645,529 | B2 | 2/2014 | Doddavula | |
| 2009/0300152 | A1* | 12/2009 | Ferris | G06F 9/5072 709/223 |
| 2011/0270968 | A1 | 11/2011 | Salsburg | |
| 2012/0054731 | A1* | 3/2012 | Aravamudan | G06F 8/63 717/170 |
| 2012/0131567 | A1* | 5/2012 | Barros | G06F 9/5088 717/170 |
| 2012/0303654 | A1* | 11/2012 | Ferris | G06F 17/30079 707/769 |

(Continued)

*Primary Examiner* — Moustafa M Meky
*Assistant Examiner* — Elizabeth Kassa
(74) *Attorney, Agent, or Firm* — Anthony V. S. England; Nicholas Bowman

(57) ABSTRACT

For migrating a workload, a workload running in a first system is scanned, wherein the scanning is prior to migrating the workload to a second system and detects features installed in the first system for the workload, including service management features. How the features for the workload are configured is determined responsive to the scanning detecting features installed in the first system for the workload. An identity record is created that identifies the detected features and defines how the detected features are configured in the first system. The identity record is sent to a second system. The second system is sent a request for migrating the workload to the second system, wherein the request specifies for the second system to provision a workload configured with features specified in the identity record.

17 Claims, 10 Drawing Sheets

(56) References Cited

U.S. PATENT DOCUMENTS

| | | | |
|---|---|---|---|
| 2012/0304179 A1* | 11/2012 | Devarakonda | G06Q 10/00 718/102 |
| 2012/0311154 A1 | 12/2012 | Morgan | |
| 2012/0311571 A1 | 12/2012 | Morgan | |
| 2012/0331113 A1* | 12/2012 | Jain | G06F 9/5072 709/220 |
| 2013/0086235 A1 | 4/2013 | Ferris | |
| 2015/0113531 A1* | 4/2015 | Lv | G06F 9/4856 718/1 |

* cited by examiner

TECHNOLOGY FOR SERVICE MANAGEMENT APPLICATIONS AND CLOUD WORKLOAD MIGRATION

BACKGROUND

Since cloud computing costs have decreased year by year, it now often tends to be less expensive to deploy a computing workload in a service provider's cloud computing center than in an in-house data center. Consequently, enterprises are increasingly contracting to have their information technology (IT) systems deployed in dedicated data centers where cloud computing is provided.

SUMMARY

According to embodiments of the present invention, a method for migrating a workload includes scanning a workload running in a first system, wherein the scanning is prior to migrating the workload to a second system and detects features installed in the first system for the workload, including service management features. The method further includes determining how the features for the workload are configured responsive to the scanning detecting features installed in the first system for the workload. Still further, the method includes creating an identity record identifying the detected features and defining how the detected features are configured in the first system. Also, the method includes sending the identity record to a second system and sending to the second system a request for migrating the workload to the second system, wherein the request specifies for the second system to provision a workload configured with features specified in the identity record.

Additional features, as well as system and computer program products relating to the above-summarized method are also described and claimed herein.

DETAILED DESCRIPTION

Figure 1:
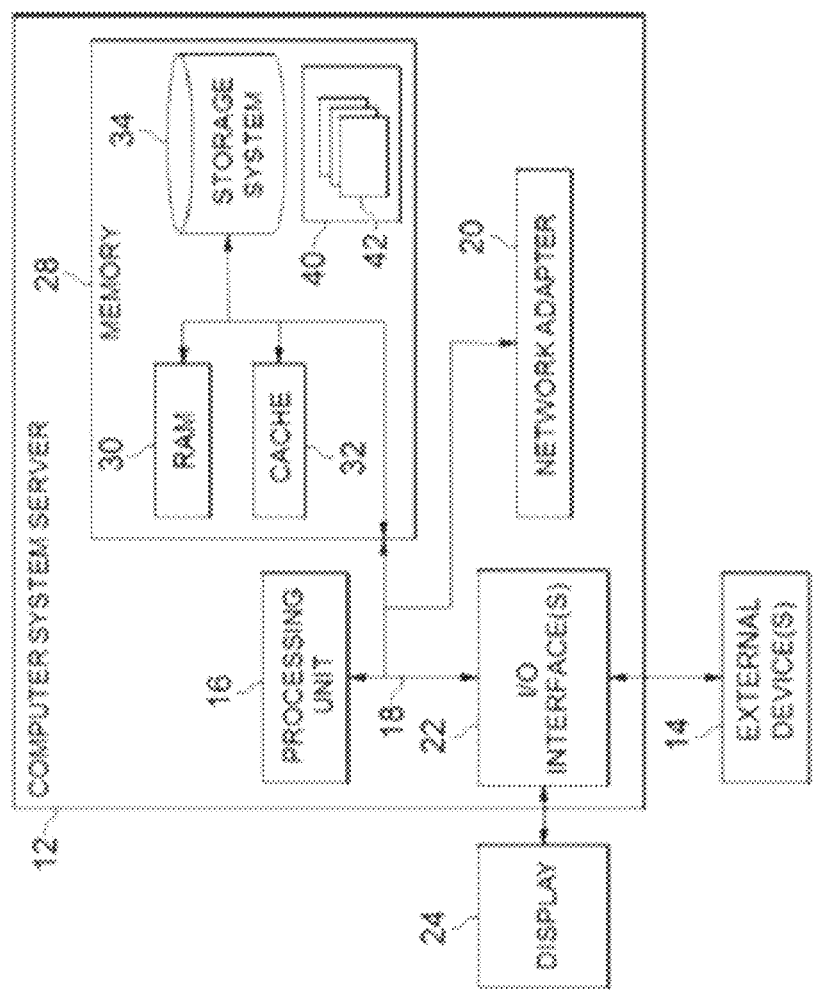
FIG. 1 depicts a cloud computing node, according to one or more embodiments of the present invention.

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As the number and variety of cloud computing service providers increases, it now occurs that enterprises contract to have their deployed workloads migrated from one service provider's cloud infrastructure to another. It is generally understood that cloud computing provides on-demand, self-service, wherein a consumer can provision computing capabilities, such as server time and network storage, without requiring human to human interaction with each cloud computing service provider. However, on-demand, self-service is not available for migration of cloud computing from one provider to another. Consequently, it is challenging to maintain function, security, performance, and availability when migrating deployed cloud applications.

What is disclosed herein includes recognition that this challenge is indirectly due at least partly to service management tools, such as tools for backup, monitoring, security, performance, configuration, patching, etc. That is, a cause of this challenge arises because specifications and parameters for governing migration of a deployed workload to a new cloud provider, such as parameters defining workload characteristics, are defined in terms at least partly dictated by specific service management tools. When a new provider uses different service management tools than a previous provider, as is often the case, specifications and parameters defined for the previous deployment are not clearly applicable to the deployment in the new cloud infrastructure. One effect of this situation is that specific service management needs of an enterprise workload may not be adequately taken into account prior to migration, which leads to labor intensive, manual adjustments during and after migration.

As used herein, a "workload" refers to a self-contained unit including an operating system and one or more of applications, middleware and databases devoted to one or more specific computing tasks. Regarding enterprises contracting to have their deployed workloads migrated from one service provider's cloud infrastructure to another, actions and structures are herein described, more generally speaking, for accomplishing migration of a workload, where an enterprise (or individual) has its workload deployed on a first infrastructure and causes migration of the workload to a second infrastructure. Such enterprise or individual may be referred to as a "workload user." The workload user may perform the migration or may direct one or more service providers to do so. For example, the workload user may direct a service provider to migrate the workload from the workload user's own infrastructure to a second infrastructure of the service provider. Or, for example, the workload user may direct a first service provider to migrate the workload from the first service provider's infrastructure to a second infrastructure of a second service provider, or even to a second infrastructure of the first service provider.

Disclosed herein are ways to capture service management specifications and parameters defined for a previously deployed workload and translate them so that they are applicable to a new cloud computing infrastructure for the workload. More specifically, disclosed herein are computer implemented ways to define and keep necessary and sufficient information, including service management information, for deploying a specific workload in a new cloud infrastructure, i.e., information such as configurations, specifications, standards, important data and parameters like workload characteristics, etc. By capturing this information, specific service management needs of a workload user workload may be adequately taken into account prior to migration of the workload from one cloud computing infrastructure to another. According to embodiments of the present invention, a workload user may define its own service management standards, parameters, etc. for migration, which may relate to function, security, performance, availability, backup, monitoring, etc.

Embodiments of the present invention also address obstacles that tend to prevent one cloud service provider from using the same service management tool as another provider. This includes embodiments enabling use of third party service management tools by a cloud computing service provider, since embodiments of the present invention determine and record configuration of a workload user's workload service management features and since embodiments communicate these features to a new cloud computing service provider. That is, since this provides the cloud computing service provider a clear definition of service management specifications that is widely applicable, it allows the cloud computing service provider to apply a wider variety of service management tools rather than being limited to a fixed set of tools. Consequently, for the workload user that is the service provider's customer, it allows the workload user to dictate which tools the service provider shall use for the workload of the workload user.

Regarding these same aspects of embodiments of the present invention, i.e., determining and recording configuration of an workload user's workload service management features and then communicating the features to a new cloud computing service provider, these aspects may alternatively address obstacles that tend to prevent one cloud service provider from using the same service management tools for workloads of different customers. That is, a clear definition of service management technological features is received by the cloud computing service provider due to embodiments of the present invention. This allows the new service provider to apply the same set of service management tools for the workloads of different customers without the workloads experiencing any change in service management features, regardless of change in service management tools from one cloud computing infrastructure to the next.

According to embodiments of the present invention, a computer implemented identification process creates an identity record associated with each workload, where the record defines service management needs and configurations and enables cloud providers to automatically deploy predetermined service management applications for the workload as part of a migration, including service management applications predefined by the workload user that is contracting for the migration. The following, according to embodiments of the present invention, are some of the actions performed by the identification process and consequences of those actions:

creating an ID record to help in cloud migration workloads, where the record includes all important information needed to migrate a cloud based service to a new cloud provider;

leveraging the identifier record to help in automatic migration of workload and deployment of all important service management tools and services that need to be deployed;

getting a cloud based service automatically set up in a production environment by deploying all needed service management disciplines and tools;

configuring service management tools and services deployed to manage an existing workload, which includes not only a workload migration stage, but also activities inherent to complete management of the workload in a product and platform independent manner;

helping in migration of workloads to any provider;

ensuring that existing service management tools may be deployed and leveraged in an automatic way to minimize costs and labor and expedite an entire migration process, extending beyond merely the workload deployment to include also deployment of management tools, as well;

enabling any cloud provider or product to read, identify and deploy its tool, independent of product;

identifying a way to register and automate service management tools for deployment to support workload, which is done in a manner independent of service management tool and product that may be used by any workload user, including not only cloud providers, but also service management providers and others; and expediting and automating service management applications deployed during cloud workload migration.

The following benefits are achieved:

expedite cloud workload migration;

decrease manual activities;

decrease labor activities;

leverage current workload management needs; and enable easy inter-cloud migration—no dependency of cloud technology or cloud provider It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
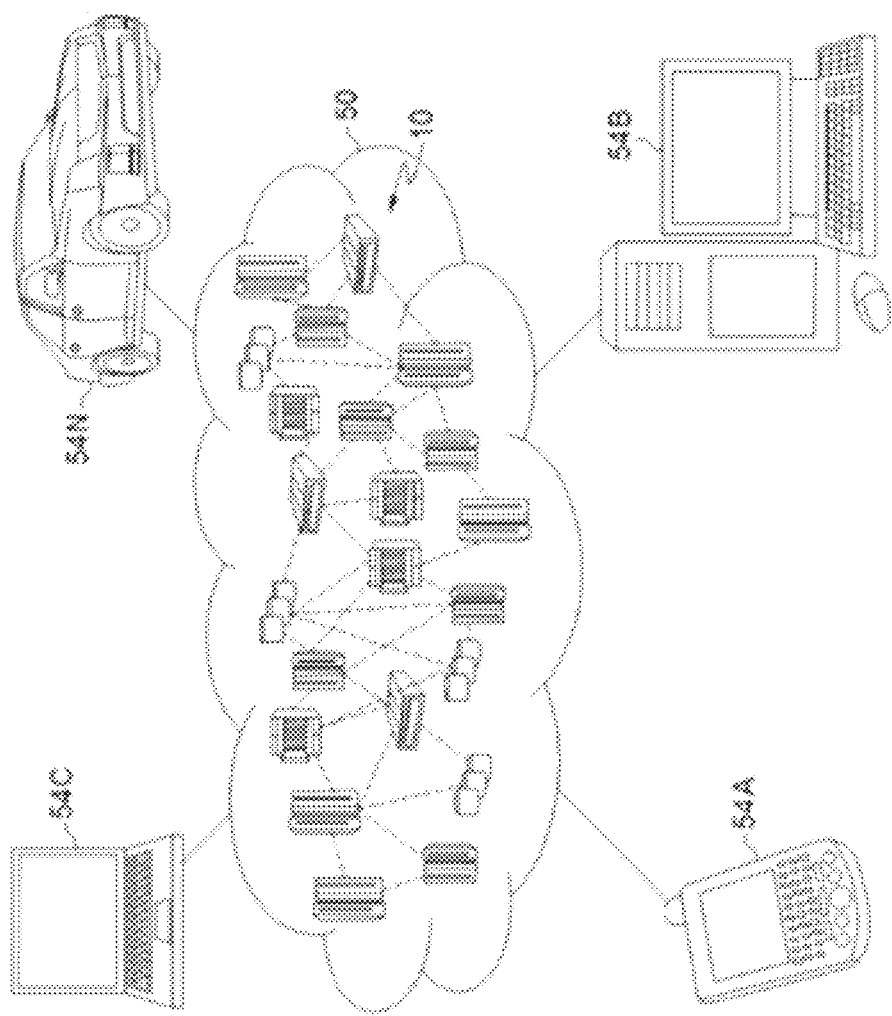
FIG. 2 depicts a cloud computing environment, according to one or more embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
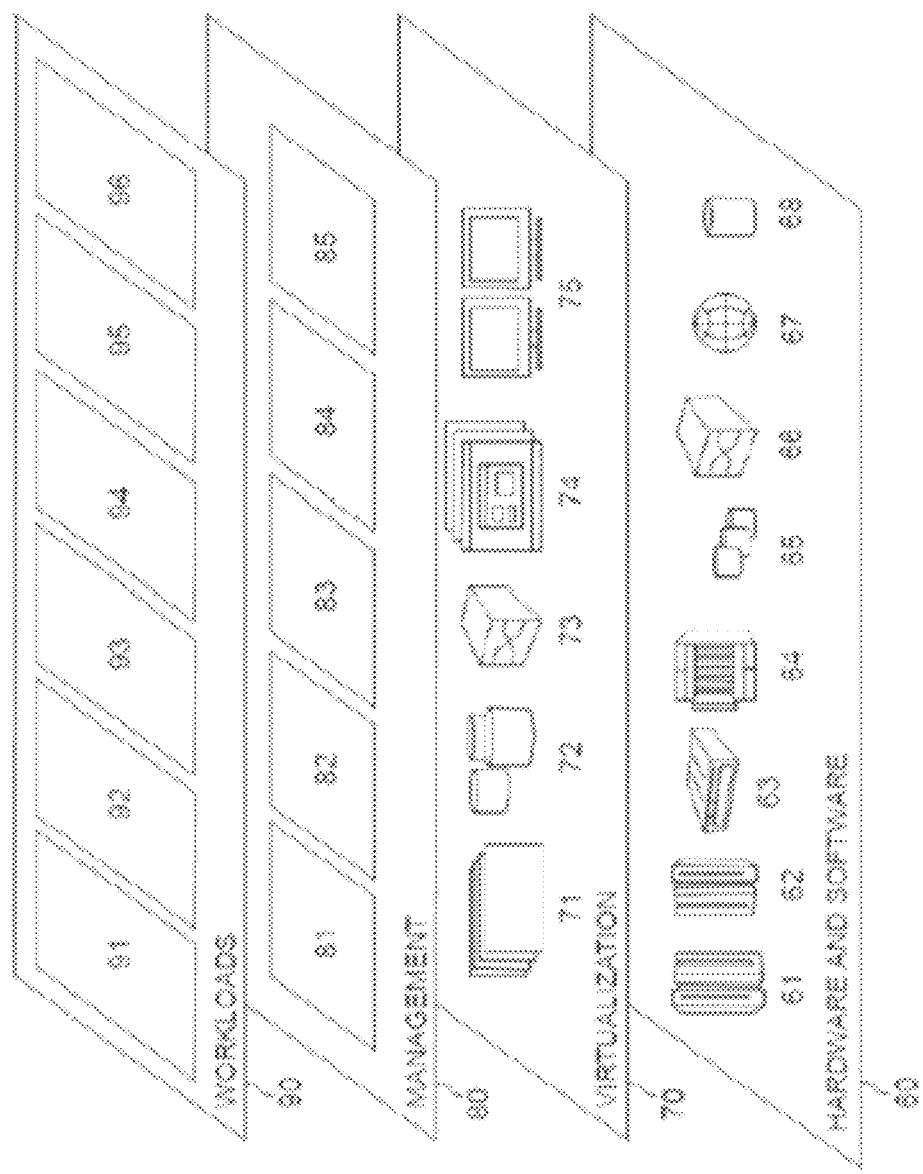
FIG. 3 depicts abstraction model layers, according to one or more embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91, software development and lifecycle management 92, virtual classroom education delivery 93, data analytics processing 94, transaction processing 95, and migration 96.

Aspects disclosed herein are not limited to particular cloud environments, such as migration from CMS to SoftLayer, from SoftLayer to Private Cloud, etc. Aspects disclosed may enable and assist external cloud providers, such as AWS, Azzure, etc., and/or tools to expedite a workload migration process. A tool and product independent arrangement is disclosed, which includes the identification process registering what service management features needs to be deployed and how the features need to be configured, so any service management tool can provide the feature. Concerning monitoring, for example, this may include the identification process registering what kind of memory utilization and threshold to track, such as for alerting purposes, so any service management tool can deploy the monitoring feature.

Figure 4:
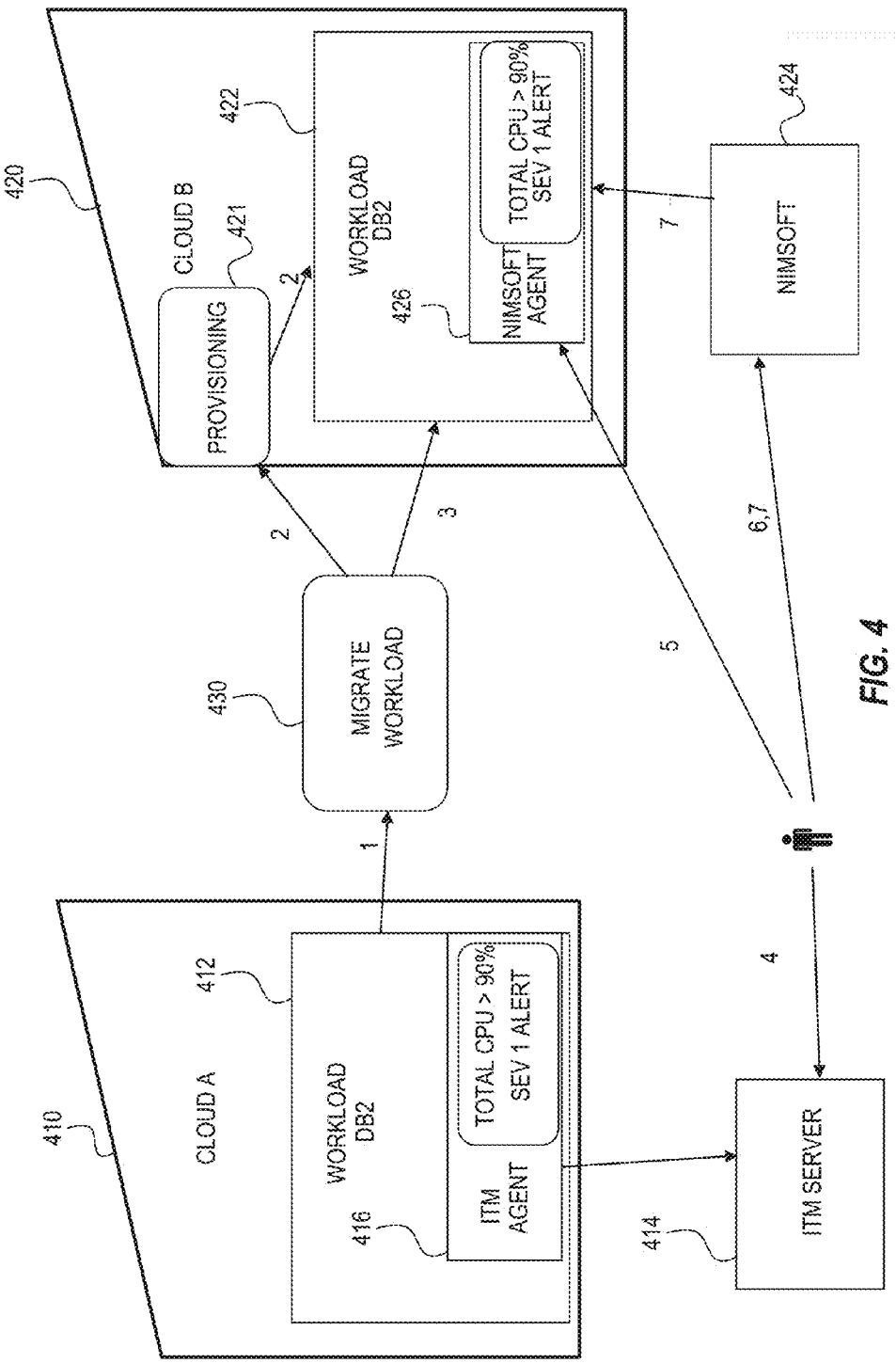
FIG. 4 illustrates aspects of migrating a workload to a new cloud environment without the use of an identification process, according to one or more embodiments of the present invention.

During a workload's lifecycle, various system management tools are deployed into the workload using different products by different parts of an enterprise, which may include parts of a service provider enterprise. When there is a need to migrate this workload to another cloud provider or another environment, these deployed tools (and their configuration) also must be installed and re-configured in the new infrastructure. FIG. 4 illustrates aspects of migrating this workload to a new cloud environment without the use of the identification process.

In the example illustrated in FIG. 4, two independent cloud environments 410 and 420 use different technologies, wherein cloud 410 has a Cloud Managed Services ("CMS") configuration that provisions workloads via Tivoli Service Automation Manager "(TSAM")" (not shown) and runs an IBM Tivoli Monitoring ("ITM") service management tool 414 for monitoring (i.e., software also referred to herein as "ITM server"), while cloud 420 has a SoftLayer configuration that provisions workloads via its internal provisioning engine 421 and runs an open source NIMSOFT service management tool 424 for workload monitoring. (CMS, TSAM, SoftLayer and ITM are services or software offered by International Business Machines Corporation, while NIMSOFT is open source. However, the examples are not intended to indicate that embodiments of the present invention are limited to these cloud infrastructures.) Workload 412 running in cloud 410 includes a simple DB2 server running via Linux. (DB2 is software offered by International Business Machines Corporation.) ITM service management tool 414 has only one monitor 416 deployed which monitors CPU usage and is configured to alert when CPU usage reaches >90%, wherein the alert indicates a high severity event as "SEV 1."

As used herein, the term computer system "provisioning" generally refers actions to prepare the system with data and software, for example, that makes the computer system ready for network operation, which may include selecting a server from a pool of servers, loading the software, such as operating system, device drivers, middleware, and applications, configuring (e.g., IP address and IP Gateway). In cloud computing, provisioning may be via a web user interface or an application programming interface, for example, and is typically so quick and easy that provisioning may be triggered automatically by monitoring software detecting that existing resources have become too heavily stressed. Provisioning is generally followed by "deploying," i.e., installing and configuring additional software, such as service management agents.

To migrate workload 412 running in cloud 410, so that it becomes workload 422 running in cloud 420, as shown, workload 412 must be specified to migration tool 430. Likewise, the CMS configuration of cloud 410 must be identified to tool 430. Then tool 430 sends a request to process 421 to provision new workload 422, where the request includes the specifications. Provisioning process 421 responsively creates new workload 422 and installs needed software (not shown), whereupon migration tool 430 migrates specific configurations of workload 412 and sets up new workload 422.

Although migration tool 430 is finished at this point, monitor 426 must be enabled, which requires identifying what monitoring 416 was deployed at cloud 410. (Depending on availability of information and communication channels, identifying it may be difficult to obtain the monitoring 416 configuration. It conventionally tends to be more difficult to get communication established when moving a workload from one service provider to another.) Finally, a human administrator initiates installation, configuration and deployment of new monitoring agent 426 in workload 422, which in the illustrated instance is a different technology 424 than the technology 414 of agent 416.

Because technology 424 is different than technology 414, the administrator must not only determine the configuration of monitoring agent 416, but must also translate this to an equivalent configuration for monitoring agent 426. According to embodiments of the present invention, this manual work is avoided by computer implemented process 710 shown in FIG. 7 automatically building an identity record 510 for workload 412 and its service management features. Record 510 identifies deployed service management tools and configurations thereof, e.g., monitoring agent 416 in the illustrated instance, and stores this information in a standard configuration format for use in migration.

Figure 5:
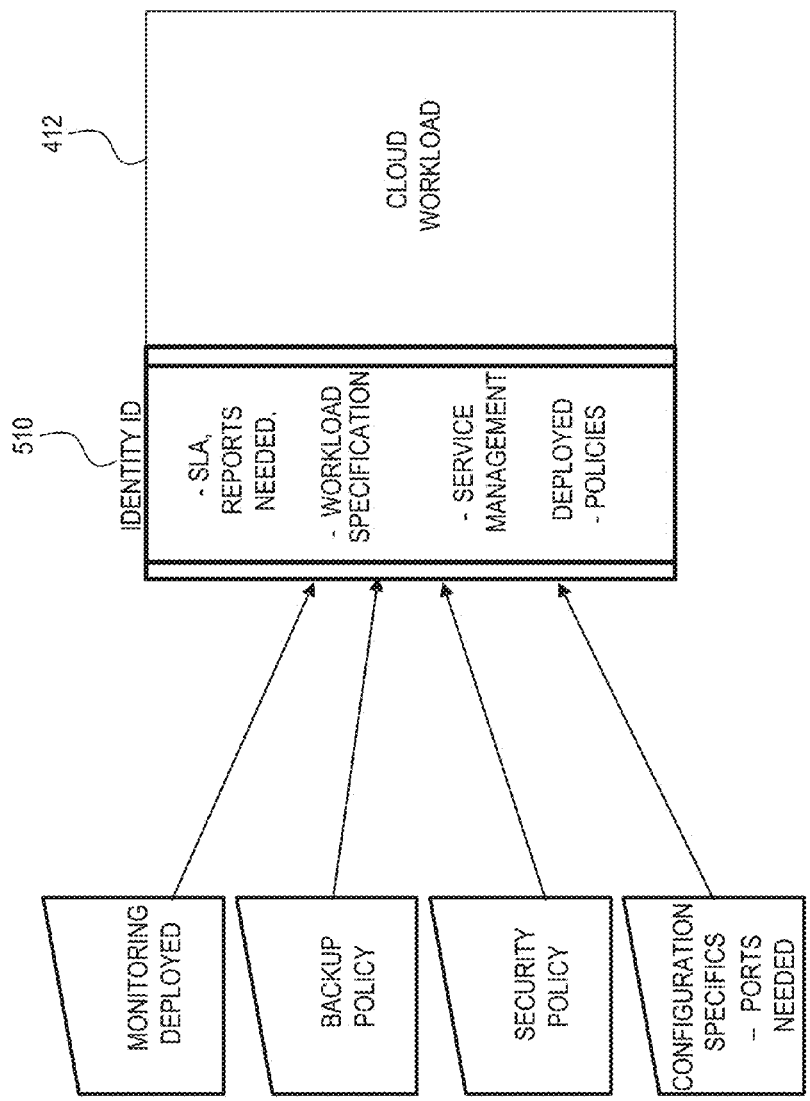
FIG. 5 illustrates an identity record, according to one or more embodiments of the present invention.

Identity record 510, as shown in FIG. 5 according to one or more embodiments of the present invention, provides a unique identity associated with workload 412 and includes necessary and sufficient information to maintain workload 412, i.e., features for replicating workload 412 and its level of performance, including i) workload specification, e.g., resource and configuration requirements for workload features including cpu, memory, disk, page, system, etc., and ii) service management information, e.g., service resource and configuration requirements for service features including what monitoring is deployed, what backups occur per a defined backup policy, what security constraints are imposed by a defined security policy, configuration specifics, like ports used, etc. and performance requirements, such as may be specified by a service level agreement, for example. Record 510 may be in an XML format, for example, so it may be universally readable.

Figure 6:
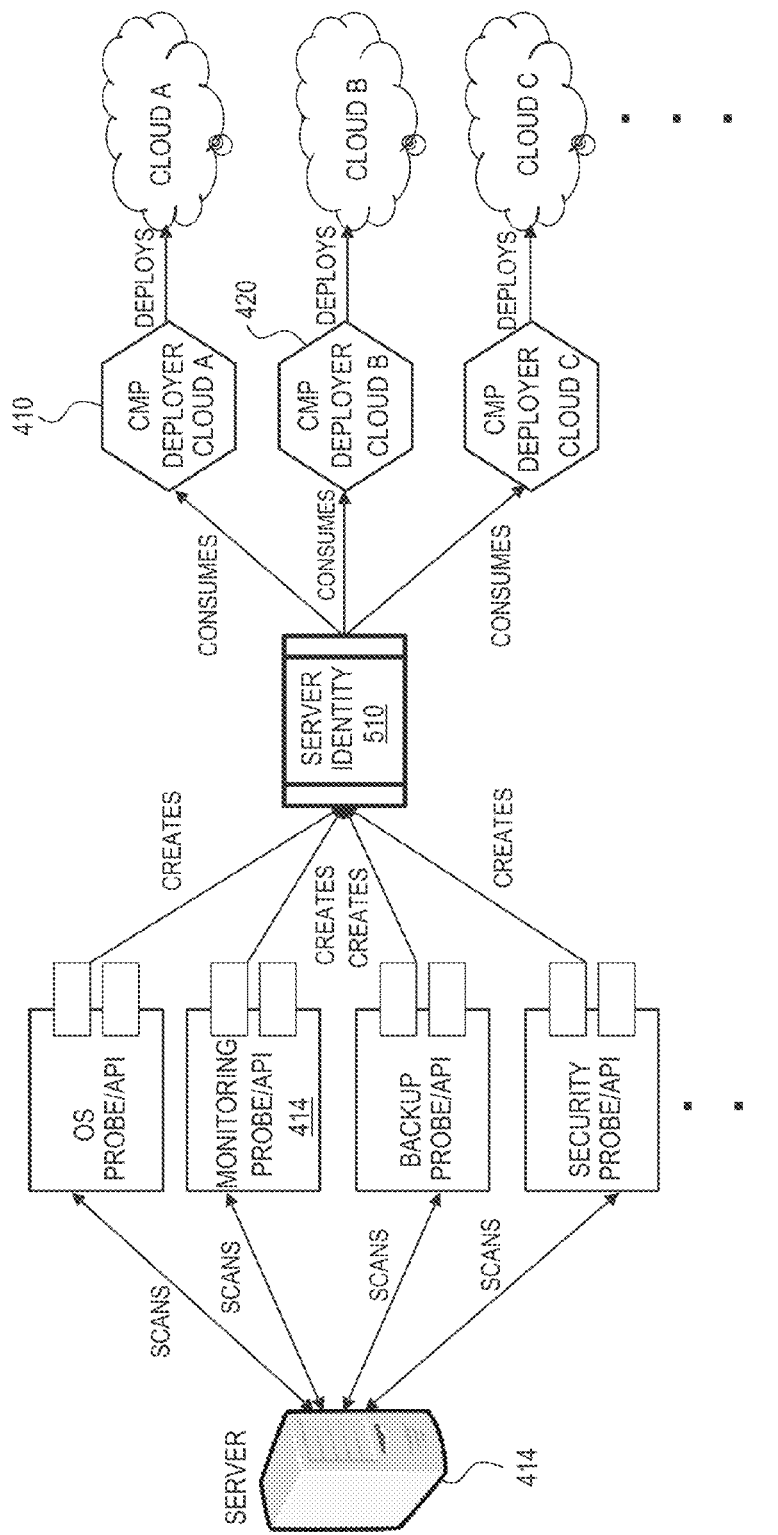
FIG. 6 illustrates creation and use of an identity record, according to one or more embodiments of the present invention.

FIG. 6 illustrates in general terms how creation and use of identity record 510 occurs, according to one or more embodiments of the present invention. For a workload, such as the illustrated workload 412, process 710 (FIG. 7) of workload 412 scans workload 412 prior to migration to detect what workload and service management features 610 are initially installed and how they are configured, such as monitoring feature 416 shown in the example, and creates identity record 510 for the features 610. Then, for provisioning workload 412 and service management tools therefor in a new cloud infrastructure as workload 422, a provisioning process 620 of a cloud management platform (CMP), such as a process 620 of provisioning engine 421 of platform 420, provisions workload 412 and reads record 510, which is enabled by record 510 being configured in a format that is universally readable, i.e., independent of technology or provider. Provisioning engine 421 then deploys service management features 610 responsive to the installation and configuration indicated in record 510.

Figure 7:
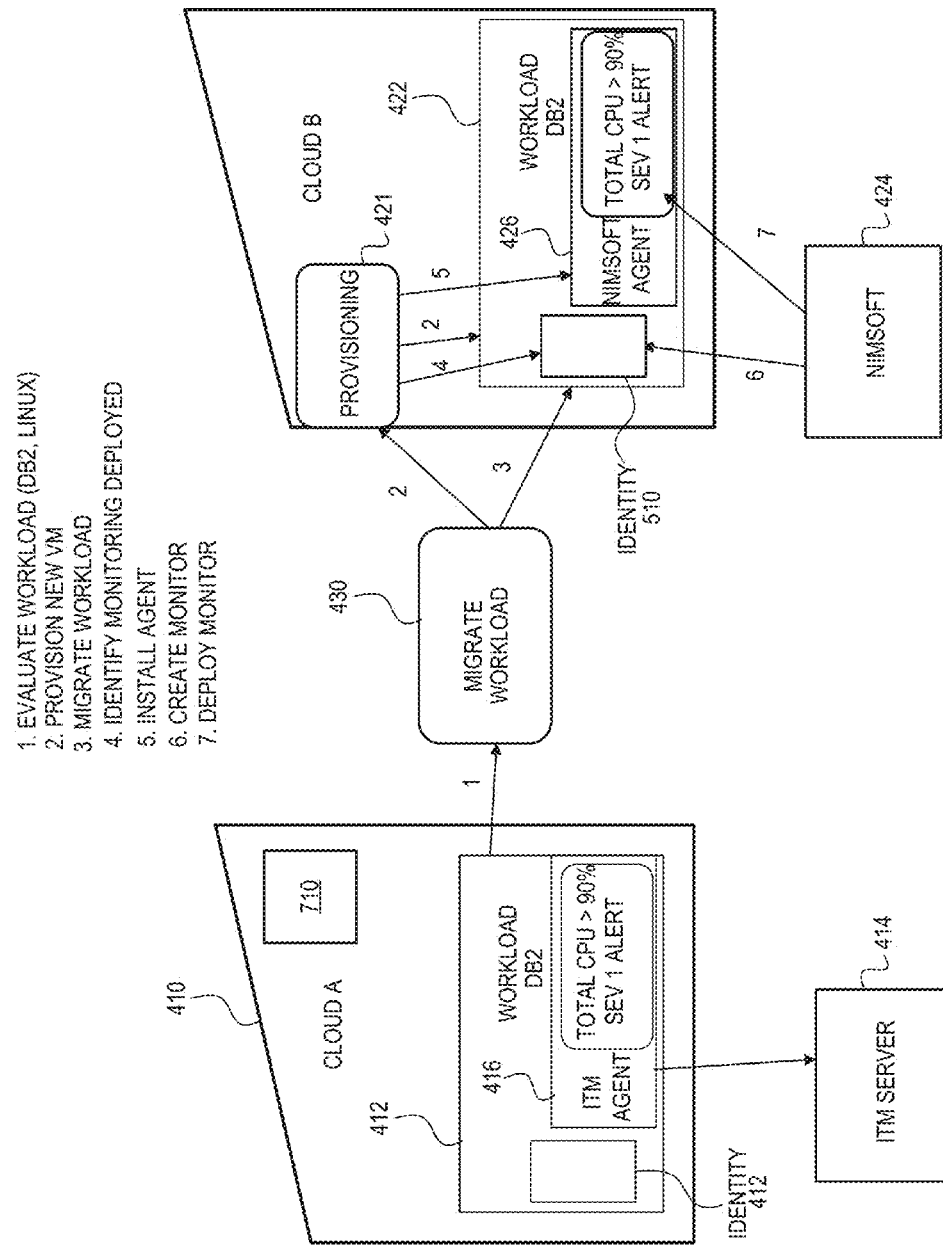
FIG. 7 illustrates aspects of migrating a workload to a new cloud environment with the use of an identification process, according to one or more embodiments of the present invention.

Referring now to FIG. 7 together with FIG. 6, FIG. 7 illustrates in general terms how a workload migration process works, according to one or more embodiments of the present invention. Identification process 710 runs in workload 412 prior to migration, collects all definitions related to service features 610 installed, such as ITM monitoring agent 416, for example, and creates identity records 510. That is, collecting definitions includes process 710 detecting whether an ITM monitoring agent 416 is running on workload 412, for example, and determining its path if it is, which may be done by process 710 executing a command, such as "ps -ef|grep ITM" in a workload 412 with a Linux operating system, for example.

Responsive to determining that a service management feature 610 is running, process 710 imports definitions of the executing service management features 610, such as ITM monitoring agent 416, for example, which defines how they are configured. Process 710 may do this for TTM monitoring agent 416, for example, by using a "tacmd exportsit" command, which requests service management server 414 to export this information to process 710.

Then, responsive to receiving one, process 710 parses the service management definition it receives from service management server 414 and process 710 responsively creates and exports a universally readable identify record 510 to migration process 430, such as in the format shown below for the monitoring aspect of the service management features:

```
<catalog>
    <monitoring>
        <OS>
            <cpu>
                <monitor>totcpu</monitor>
                <compare>GT</compare>
                <threshold>90%</threshold>
                <alert>sev1</alert>
            </cpu>
        </OS>
    </monitoring>
</catalog>
```

Figure 8:
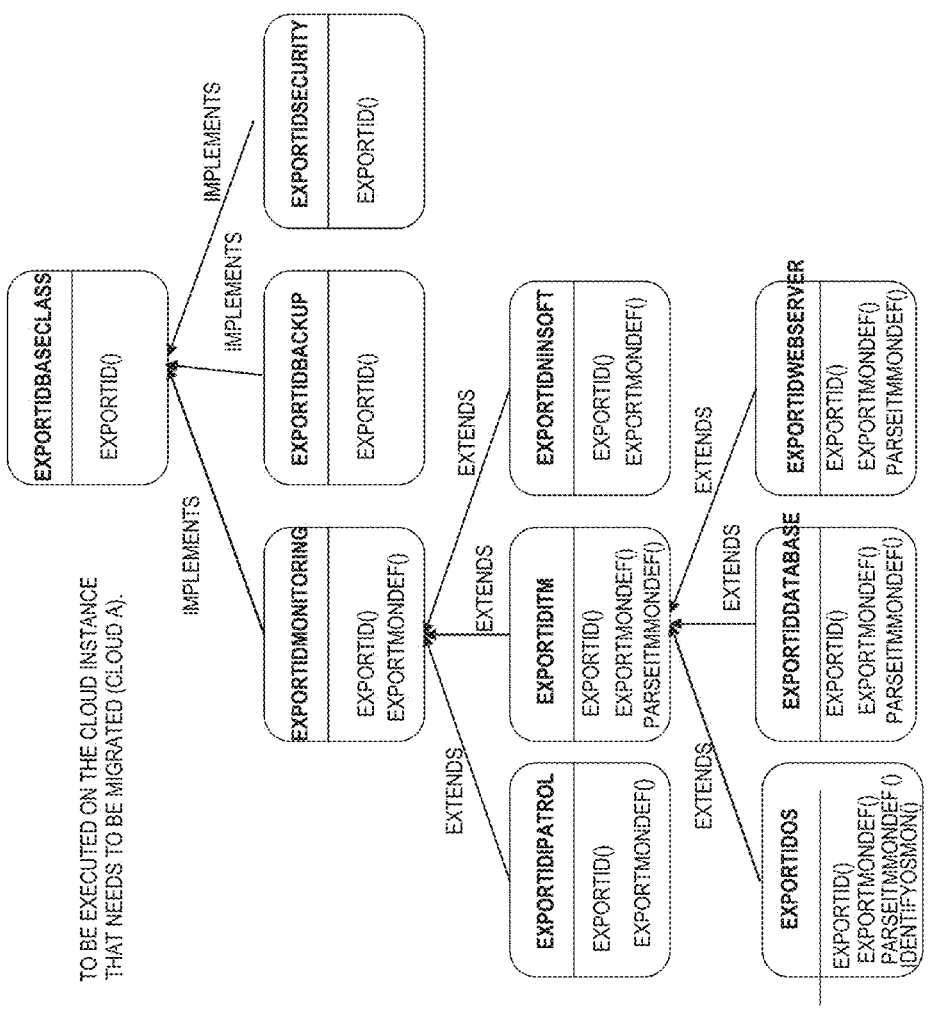
FIG. 8 illustrates a class structure for instantiating methods to perform exporting of an identity record, according to one or more embodiments of the present invention.

FIG. 8 illustrates a class structure for instantiating methods to perform the above described exporting of identity record 510, according to an embodiment of the present invention. (Only details for a monitoring feature are illustrated in FIG. 8, but it should be understood that this same kind of structure applies for all service management technologies.)

Once process 710 creates record 510, it requests provisioning process 421 of cloud 420 to provision a new workload 422 with specifications indicated in record 510. Provisioning process 421 then creates new workload 422 and installs service management features such as agent 426, etc. defined in record 510. Migrate workload tool 430 then migrates specific configurations defined in record 510 to setup new workload 422. Then provisioning process 421 reads identity record 510 to determine what service management features to automatically deploy. For the purpose of the illustrated example, process 421 reads the record 510 and identifies that a monitoring agent is specified therein, for example. Since record 510 is product/platform independent, any provisioning tool is able to read it. Provisioning process 421 then responsively installs a new monitoring agent 426 in workload 422. Since it reads from identity record 510, process 421 knows what kind of agent is needed. In this example, agent 426 is specified by record 510 to be a NIMSOFT agent.

Once agent 426 is installed, for example, agent 426 connects with NIMSOFT server 424. At the new server 424, process 710 performs the following:
 a. Import monitoring identity record 510, e.g., XML file, such as through executing a command in workload 422,
 b. Parse monitor definition from record 510, and
 c. Responsive to the monitor definition specified in record 510, request server 424 to deploy monitoring.

Figure 9:
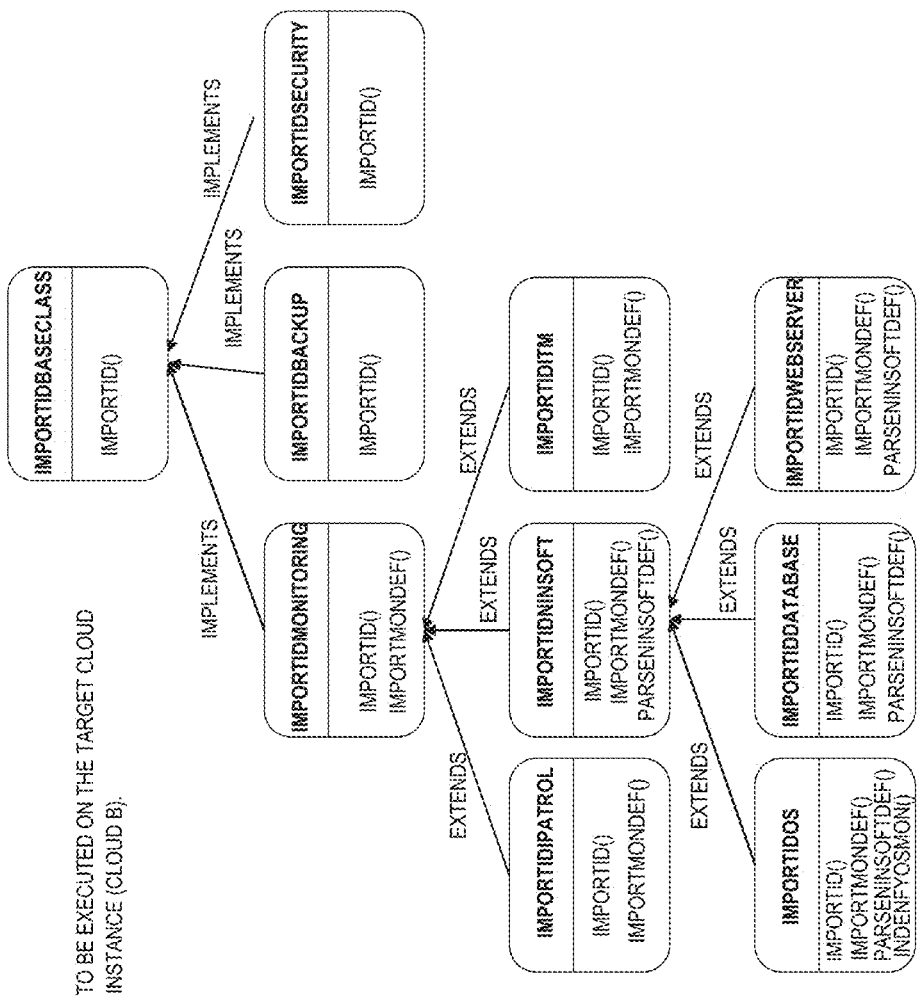
FIG. 9 illustrates a class structure for instantiating methods to perform importing of an identity record and requesting of service management deployment, according to one or more embodiments of the present invention.

FIG. 9 illustrates a class structure for instantiating methods to perform the above described importing of identity record 510 and requesting of service management deployment, according to an embodiment of the present invention. (Once again, details for a monitoring feature are illustrated in FIG. 9, but it should be understood that this same kind of structure applies for all service management technologies.) As explained before, this arrangement is flexible enough to add new tools and products by any vendor. Each organization can develop their own methods/API based on which tools they use in their environment.

Finally, responsive to the request to deploy, monitoring server 424 then deploys the service management features into the new workload, e.g., monitor feature in this illustrated instance, which may be deployed by a default standard command or API (NIMSOFT in the illustrated instance). In this manner, the migration is fully completed in an autonomous way, without human intervention.

Figure 10:
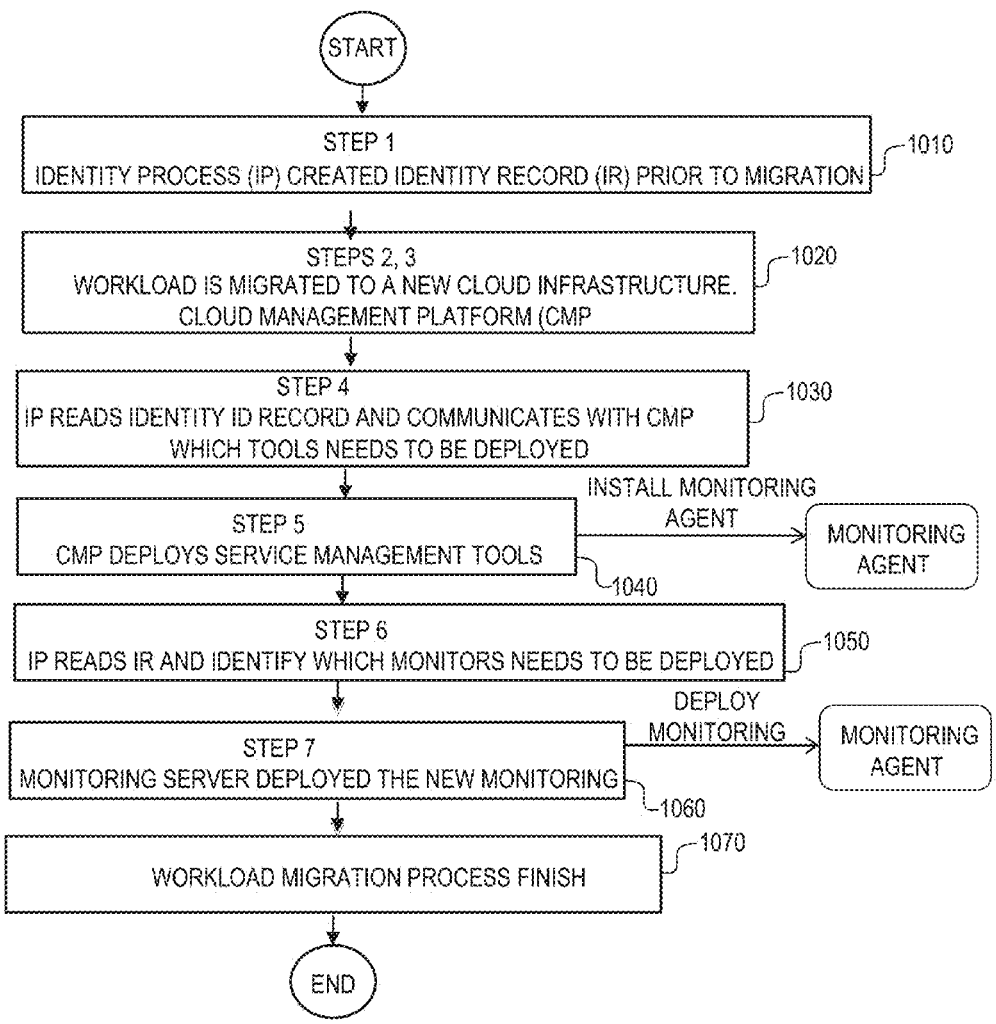
FIG. 10 provides a flow chart illustrating actions by a computer system, according to embodiments of the present invention, according to one or more embodiments of the present invention.

FIG. 10 illustrates the above described actions in a flow chart format, according to one or more embodiments of the present invention. As shown, the identity process creates an identity record prior to migration at 1010. The workload is migrated to a new cloud infrastructure at 1020. The identity process reads the identity record to determine which service management tools need to be deployed and communicates this information to the new cloud infrastructure 1030. The cloud infrastructure deploys (at 1040) service management tools responsive to the notification received from the identification process at 1030. The identity process reads the identity record again to determine which particular service management features, i.e., processes, need to be deployed, such as a monitoring process, for example, and communicates this information to the monitoring server in the new cloud infrastructure at 1050. In response, the monitoring server deploys the new service management process or processes at 1060. With migration now complete, the identity process halts at 1070.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and application modules that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper application modules, plug-ins, and the like.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

Many modifications and variations will be apparent to those of ordinary skill in the art without departing from the scope and spirit of the invention. For example, examples have been presented herein in which a user selects data using a spreadsheet application module, but the invention is not limited to user interaction with data via a spreadsheet. In general, a user may interact with data that is structured such that the user can select portions of the data that go together, such as in a table or tables. Some file formats like CSV present tabular data that is suitably structured, for example. Examples have been presented herein in which a report is generated by a tool that embodies the invention. The tool may present both the report and a view of the underlying data that permits user interaction with the source data, including data selection. IBM Watson Analytics is a good example of such a tool. The tool may also be implemented as a spreadsheet application module, such as by a spreadsheet plugin for example. Also a database application module may present a view of data in a manner that permits a user to interact with the source data as described herein.

The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description, but is not intended to be exhaustive or limited to the invention in the form disclosed.

What is claimed is:
1. A method for migrating a workload comprising:
   scanning, by a first computer system, a workload running in the first computer system, wherein the scanning is prior to migrating the workload to a second computer system and detects features installed in the first computer system for the workload, including service management features;

determining, by the first computer system, how the features for the workload are configured responsive to the scanning detecting features installed in the first computer system for the workload, wherein determining how the features for the workload are configured comprises:
sending, by the first computer system responsive to the scanning detecting that a first service management feature of a first service management provider is installed, a request to a service management server, wherein the request is for a definition of how the installed, first service management feature is configured;
receiving, by the first computer system from the service management server, the definition of how the installed, first service management feature is configured, where the received definition is in a format readable by the first service management provider; and
parsing the received definition by the first computer system;
where the method further comprises:
creating an identity record by the first computer system, where the identity record identifies the detected features and defines how the detected features are configured in the first computer system, wherein creating the identity record that defines how the detected features are configured in the first computer system comprises:
creating a translation for the identity record responsive to the parsing of the definition, wherein creating the translation comprises:
translating, by the first computer system, the parsed definition that was received by the first computer system from the service management server and that defines how the installed, first service management feature is configured, including translating the parsed definition from the format readable by the first service management provider into a translated definition format that is readable independently of the first service management provider; and
providing the translation in the identity record created by the first computer system, so that the created identity record includes the translated definition of the first service management feature;
where the method further comprises:
sending the identity record by the first computer system to the second computer system; and
sending, to the second computer system by the first computer system, a request for migrating the workload to the second computer system, wherein the request for migrating specifies for the second computer system to provision a workload configured with features specified in the identity record, including the translated definition of the first service management feature in the format for that is readable independently of the first service management provider, so that the second computer system is enabled by the translated definition to configure the workload with a second service management feature of a second service management provider that is configured like the configuration of the first service management feature of the first service provider.

2. The method of claim 1, wherein scanning the workload running in the first computer system includes scanning by a process running in the workload in the first computer system.

3. The method of claim 1, wherein creating, by the first computer system, the identity record identifying the detected features and defining how the detected features are configured in the first computer system comprises:
creating the identity record in an extensible markup language format responsive to the parsing of the definition, where the extensible markup language format is configured such that the identity record created by the first computer is in a format that is readable independently of the first service management provider.

4. The method of claim 1, wherein creating the identity record identifying the detected features and defining how the detected features are configured in the first computer system comprises:
creating the identity record by a process running in the first computer system.

5. The method of claim 1, wherein the workload running in the first computer system runs in a cloud computing infrastructure in the first computer system, and wherein the request specifies for the second computer system to provision the requested workload in a cloud computing infrastructure in the second computer system.

6. The method of claim 1, comprising:
reading the identity record in the second computer system and deploying in the second computer system the features that are specified in the identity record.

7. A system comprising:
a processor; and
a computer readable storage medium operatively coupled to a computer system, wherein the computer readable storage medium has stored thereon a program for controlling the computer system, and wherein the program is executable by the computer system to cause the computer system to:
scan, by a first computer system, a workload running in the first computer system, wherein the scanning is prior to migrating the workload to a second computer system and detects features installed in the first computer system for the workload, including service management features;
determine, by the first computer system, how the features for the workload are configured responsive to the scanning detecting features installed in the first computer system for the workload, wherein determining how the features for the workload are configured comprises:
sending, by the first computer system responsive to the scanning detecting that a first service management feature of a first service management provider is installed, a request to a service management server, wherein the request is for a definition of how the installed, first service management feature is configured;
receiving, by the first computer system from the service management server, the definition of how the installed, first service management feature is configured, where the received definition is in a format readable by the first service management provider; and
parsing the received definition by the first computer system;
where the method further comprises;
create an identity record by the first computer system, where the identity record identifies the detected features and defines how the detected features are configured in the first computer system, wherein creating the identity record that defines how the detected features are configured in the first computer system comprises:
creating a translation for the identity record responsive to the parsing of the definition, wherein creating the translation comprises:
translating, by the first computer system, the parsed definition that was received by the first computer system from the service management server and that defines how the installed, first service management feature is configured, including translating the parsed definition from the format readable by the first service management provider into a translated definition format that is readable independently of the first service management provider; and
providing the translation in the identity record created by the first computer system, so that the created identity record includes the translated definition of the first service management feature;
where the method further comprises;
send the identity record by the first computer system to the second computer system; and
send, to the second computer system by the first computer system a request for migrating the workload to the second computer system, wherein the request for migrating specifies for the second computer system to provision a workload configured with features specified in the identity record, including the translated definition of the first service management feature in the format for that is readable independently of the first service management provider, so that the second computer system is enabled by the translated definition to configure the workload with a second service management feature of a second service management provider that is configured like the configuration of the first service management feature of the first service provider.

8. The system of claim 7, wherein scanning the workload running in the first computer system includes scanning by a process running in the workload in the first computer system.

9. The system of claim 7, wherein creating, by the first computer system, the identity record identifying the detected features and defining how the detected features are configured in the first computer system comprises:
creating the identity record in an extensible markup language format responsive to the parsing of the definition, where the extensible markup language format is configured such that the identity record created by the first computer is in a format that is readable independently of the first service management provider.

10. The system of claim 7, wherein creating the identity record identifying the detected features and defining how the detected features are configured in the first computer system comprises:
creating the identity record by a process running in the first computer system.

11. The system of claim 7, wherein the workload running in the first computer system runs in a cloud computing infrastructure in the first computer system, and wherein the request specifies for the second computer system to provision the requested workload in a cloud computing infrastructure in the second computer system.

12. A computer program product for migrating a workload, the computer program product comprising a computer readable storage medium having program instructions embodied therewith, the program instructions executable by a processor to cause the processor to:

scan, by a first computer system, a workload running in the first computer system, wherein the scanning is prior to migrating the workload to a second computer system and detects features installed in the first computer system for the workload, including service management features;
determine, by the first computer system, how the features for the workload are configured responsive to the scanning detecting features installed in the first computer system for the workload, wherein determining how the features for the workload are configured comprises:
sending, by the first computer system responsive to the scanning detecting that a first service management feature of a first service management provider is installed, a request to a service management server, wherein the request is for a definition of how the installed, first service management feature is configured;
receiving, by the first computer system from the service management server, the definition of how the installed, first service management feature is configured, where the received definition is in a format readable by the first service management provider; and
parsing the received definition by the first computer system;
where the method further comprises;
create an identity record, by the first computer system, where the identify record identifies the detected features and defines how the detected features are configured in the first computer system, wherein creating the identity record that defines how the detected features are configured in the first computer system comprises:
creating a translation for the identity record responsive to the parsing of the definition, wherein creating the translation comprises:
translating, by the first computer system, the parsed definition that was received by the first computer system from the service management server and that defines how the installed, first service management feature is configured, including translating the parsed definition from the format readable by the first service management provider into a translated definition format that is readable independently of the first service management provider; and
providing the translation in the identity record created by the first computer system, so that the created identity record includes the translated definition of the first service management feature;
where the method further comprises;
send the identity record, by the first computer system, to the second computer system; and
send to the second computer system by the first computer system a request for migrating the workload to the second computer system, wherein the request for migrating specifies for the second computer system to provision a workload configured with features specified in the identity record, including the translated definition of the first service management feature in the format for that is readable independently of the first service management provider, so that the second computer system is enabled by the translated definition to configure the workload with a second service management feature of a second service management provider that is configured like the configuration of the first service management feature of the first service provider.

13. The computer program product of claim 12, wherein scanning the workload running in the first computer system includes scanning by a process running in the workload in the first computer system.

14. The computer program product of claim 12, wherein creating, by the first computer system, the identity record identifying the detected features and defining how the detected features are configured in the first computer system comprises:

creating the identity record in an extensible markup language format responsive to the parsing of the definition, where the extensible markup language format is configured such that the identity record created by the first computer is in a format that is readable independently of the first service management provider.

15. The computer program product of claim 12, wherein creating the identity record identifying the detected features and defining how the detected features are configured in the first computer system comprises:

creating the identity record by a process running in the first computer system.

16. The computer program product of claim 12, wherein the workload running in the first computer system runs in a cloud computing infrastructure in the first computer system, and wherein the request specifies for the second computer system to provision the requested workload in a cloud computing infrastructure in the second computer system.

17. The computer program product of claim 12, comprising:

reading the identity record in the second computer system and deploying in the second computer system the features that are specified in the identity record.

* * * * *